United States Patent
Theissen

[11] 3,948,702
[45] Apr. 6, 1976

[54] BI-ELASTIC TEXTILE FABRIC

[75] Inventor: Hans Theissen, Monchen-Gladbach, Germany

[73] Assignee: Krall & Roth Weberei, KG, Monchen-Gladbach, Germany

[22] Filed: June 14, 1974

[21] Appl. No.: 479,476

[52] U.S. Cl.............. 156/278; 28/74 R; 28/76 E; 57/152; 156/85; 156/247; 156/327; 427/411; 427/412; 428/230; 428/246; 428/260; 428/425
[51] Int. Cl.² ..................................... B32B 31/00
[58] Field of Search ............ 28/72 FT, 74 R, 76 E; 156/85, 160, 230, 231, 241, 247, 278; 161/76, 77, 88, 90, 92, 167, 190, 406; 57/152; 427/411, 412; 428/230, 246, 260, 425

[56] References Cited
UNITED STATES PATENTS

| | | |
|---|---|---|
| 3,028,279 | 4/1962 | Heberlein ........................... 161/76 |
| 3,438,842 | 4/1969 | Petterson et al. ................. 28/72 FT |
| 3,452,411 | 7/1969 | Brown.................................. 57/152 |
| 3,504,410 | 4/1970 | Alexandre.......................... 28/72 FT |

Primary Examiner—George F. Lesmes
Assistant Examiner—James J. Bell
Attorney, Agent, or Firm—Hill, Gross, Simpson, Van Santen, Steadman, Chiara & Simpson

[57] ABSTRACT

A stabilized bi-elastic fabric bonded on its underside to an elastomeric, gas-tight film adapted for use in covering upholstered furniture. The fabric is formed from a ply yarn of elastomeric filaments, coarse yarn, and fine yarn. After being woven, the fabric is stabilized by a process involving steam shrinking, washing, drying and fixing. The stabilized fabric is then heat bonded to the film which makes the composite fabric well suited for filling with foam or for vacuum deep drawing.

5 Claims, 2 Drawing Figures

BI-ELASTIC TEXTILE FABRIC

BACKGROUND OF THE INVENTION

Woven and knitted bi-elastic textiles are known, such as are used in the garment industry, for instance, for the manufacturing of corset ware and similar textiles. The known woven and knitted bi-elastic textiles are generally not suited for use as upholstering fabrics for chairs, sofas, and similar sitting or reclining furniture since they poorly comply with the general requirements for such cover fabrics. The known bi-elastic woven textiles have, for instance, a characteristic plain, smooth surface which is disadvantageous for esthetic reasons. Thus, known bi-elastic textiles have generally been heavily printed when intended for upholstering usage in order to try to hide the unsuitable surface characteristics of these textiles as cover fabrics for furniture.

However, because of new shapes for upholstered furniture, the demand for bi-elastic cover fabrics is steadily increasing. The growing use of load carrying furniture parts formed of plastic contributes considerably to the advancement of this development. Oftentimes it is desirable to use textiles which are foam fillable. Such foam-fillable textiles have to expand evenly in two dimensions and at the same time maintain their elasticity even when such a fabric is oppositely stressed, as when a person sits on such foam-filled upholstered and fabric covered chair. Corresponding facts, for instance, apply to the vacuum-deep-drawing.

Aside from the two requirements to possess as even a bi-directional expansive elasticity capacity as possible in warp and weft directions, as well as to retain a capacity to return, or contract, evenly, it is a further requirement for such a bi-elastic fabric that it have a suitable surface texture which, in respect to such qualities as wear and tear, associated coarseness, esthetic appearance and hand, and the like, makes it especially favorable from a commercial view. For this purpose, generally coarsely structured textile fabrics are especially advisable; however, known bi-elastic fabrics do not show the necessary expansion behaviour and sufficiently high elasticity, together with suitable coarse texture.

A still further requirement exists for such a bi-elastic fabric when such is to be used for filling with foam, or for vacuum deep drawing, and this is the requirement of being gas tight.

BRIEF SUMMARY OF THE INVENTION

The invention provides an improvement over known textile fabrics by avoiding their above indicated drawbacks and by meeting the above indicated requirements. This invention is directed to a bi-elastic textile fabric bonded on its underside to an elastomeric gas tight film. The fabric shows in each of its warp and weft directions a practically uniform elasticity with relatively large expansion capacity which can be maintained even in case of maximum expansion. This fabric, is rendered air or gas tight by means of an elastomeric, non-porous bonded backing coating which makes possible, for example, the filling of a furniture cavity with foam, or, for another example, the vacuum-deep-drawing of a fabric-covered plastic sheet member, without thereby loosing excessive amounts of the bi-elasticity characteristics of such combination of fabric and bonded film.

The invention utilizes in this bi-elastic fabric for each of the warp and weft fibers a ply yarn which comprises three components. One component is an elastomeric thread of approximately 140 to 280 denier. The second and third components are each yarns of natural and/or synthetic fibers which typically each have maximum tensile strengths of only about one-tenth that of the first component (the elastomeric thread). Typically and preferably, the second component is a coarse yarn of about 10 to 15 denier, and the third component is a fine yarn of about 4 to 6 denier. Independently of whether or not the second and third component yarns consist of natural or synthetic fibers, a relatively high spinning rotation in such component fibers of such yarns has been found to be very favorable and preferable for the present invention.

DETAILED DESCRIPTION

Figure 1:
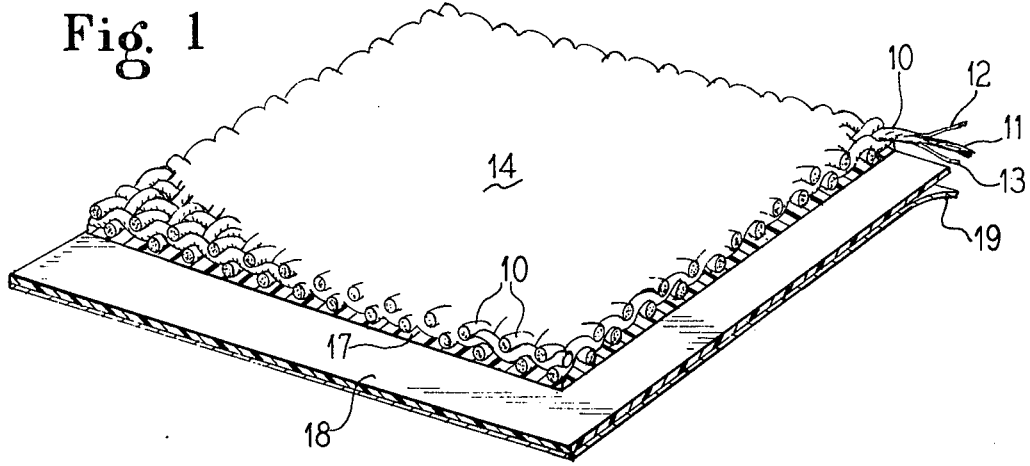
FIG. 1 is a view in perspective illustrating a bi-elastic fabric construction of this invention.

For use in the yarn 10 (referring to FIG. 1), a preferred elastomeric thread 11 is comprised of a polyurethane elastomer in polyfilament form. Suitable materials are available commercially under the trademark "Dorlaston" from the firm Farbenfabriken Bayer AG, West Germany, and "Lycra" from the E. I. du Pont de Nemours and Company, Wilmington, Del. Thread 11 has a denier of from about 140 to 280.

The second and third components 12 and 13 respectively of a yarn 10 may each be comprised, for example, of polyamides, polyesters, polyacrylics (preferred), polyvinyls, polyolefins, cellulosics (including regenerated cellulose, cellulose acetate, cellulose diacetate, and cellulose triacetates), and the like as synthetic fibers, and/or cotton, wool (preferred), and the like as natural fibers, or mixtures thereof. The second component 12 is preferably a fine yarn; the third component 13 is preferably a coarse yarn. Suitable fine yarns have deniers ranging from about 4 to 6 denier; suitable coarse yarns have deniers ranging from about 10 to 15 denier. One preferred fine yarn has a denier of about 3; one preferred coarse yarn has a denier of about 16.

The combination of the elastomeric threads with the second and third components into a ply yarn 10 which is then woven into a bi-elastic fabric 14 which not only has high elastic requirements, but also has a relatively coarse-structured, desirably lively surface. Such product fabric is relatively not especially heavy, and is relatively not very expensive.

The elastomeric thread 11 is generally not colored and has a white appearance, but is completely enclosed in the twisted, finished ply yarn 10 when such is viewed in side elevation. This effect is generally achieved even though the two yarn components 12 and 13 are each black. Preferably, the ply yarn 10 has an alpha value which lies between about 100 and 150. Thus, this ply yarn 10 differs substantially from such prior art yarn as the spun fiber covered elastomeric yarns wherein such a twisting does not take place, as those skilled in the art will appreciate.

The number of twists for individual component yarns ranges between about 110 and 425 per meter in the case of a yarn of about 16 denier and between about 130 to 225 per meter in the case of a yarn of about 3 denier, for the individual components 12 and 13. The number of twists for the ply yarn 10 are: (a) 350 to 370 twists per meter in case of a ply yarn comprising the elastomer thread and two individual component yarns of 16 denier, (b) 300 to 310 twists per meter in case of ply yarn comprising one individual component yarn of 3 denier, a second individual component yarn of 16 denier, and the elastomer thread, and (c) from 170 to 190 twists per meter in case of a ply yarn comprising two individual component yarns of 3 denier and the elastomer thread. The direction of the twist of the individual component yarns is z.

The coarse yarn has a staple length of between about 100 and 120 mm. The staple length of the fine yarn is between about 60 and 70 mm. The direction of twist for the ply yarn is s.

A weaving of ply yarn herein described by the prior art conventional looms employing variable warp and weft stresses is not possible. The weft members, ever the weaving width in such known looms, are characteristically subject to varying tension during weaving, and so such looms are generally unsuited for achieving the desired even elastic attitude for both warp and weft members in weaving a fabric of this invention. In addition, such variable tension looms tend to place the weft and warp members under high tension as laid into a fabric being woven, which causes an undesirable expansion on ply yarn members during weaving, so that ply yarn members can be stretched to their limits in a fabric being formed on such a known loom.

Consequently, in weaving a fabric for use in this invention, one uses a type of loom wherein the warp and weft members are maintainable under a minimum, or very low, constant tension. One suitable and preferred loom is a gripper loom, for example, of the type available commercially from Gusken of West Germany.

In addition, the weft density as well as the warp density are each adjusted in such a way that a product textile fabric shows, in both warp and weft directions, an evenly large expansion optionally ranging from about 15 to 50% over their relaxed state. Thereby, the raw, woven width (which is later adjusted), depends, on the one hand, on a prescribed finished width, and, on the other hand, on a prescribed degree of elasticity. The latter can be adjusted exactly by the warp-density and the weft density, and thus also by the woven textile width. Since the degree of elasticity is achieved by respective reed widths and weft widths, special reed widths are preferably used. For a finished width, of, for instance, more than about 1 m, one may use a reed width of up to about 2.5 m.

Varying warp and weft ply yarn densities per centimeter may be employed. For examples:

a. When using as warp and weft ply yarn a ply yarn comprised of an elastomer thread and two individual yarn components each of about 3 denier, one can use a warp ply yarn density of about 5 ply yarns per centimeter and a weft ply yarn density of about 5 ply yarns per centimeter.

b. When using warp and weft ply yarn comprised of elastomer thread, one component yarn of 3 denier and one component yarn of 16 denier, one can use a warp ply yarn density of about 5.5 to 5.7 of ply yarns per centimeter and a weft ply yarn density of between about 5.5 and 9.5 ply yarns per centimeter.

c. When using warp and weft ply yarn comprised of elastomer thread and two individual component yarns of 16 denier, one can use a warp ply yarn of about 10.5 to 13 yarns per centimeter and a weft ply yarn density of between about 12 and 13.5 yarns per centimeter.

After being woven, a thus produced fabric needs a certain stabilization before it can be used for the desired purposes, as those skilled in the art will appreciate. In one preferred stabilization procedure, at first the fabric is steam shrunk tension-free, until the widened fibers adjoin, and then, after decondensing, the tension-free or relaxed fabric is washed before being dried. To maintain the fabric in a relaxed state, it is advisable to roll up the fabric prior to the decondensing in one procedure.

Although not common with known textile fabrics which can obtain their fixed width after steaming in a drying frame, a fabric of this invention after steam shrinking is preferably washed in a nonacid aqueous liquid, such as a die bath liquor, which may be neutral or slightly alkaline, and is maintained preferably at about 40° to 50°C. Preferably, a residual oil content of less than about 0.5 wt.% may be attempted.

Thereafter, the fabric can optionally be conventionally padded, if desired, under slight warp and weft stretching tension, for example, under about 3%. If padded under relaxed conditions, a fabric may be treated with a small quantity of softener and/or an anti-static agent of the types known to the prior art conventionally.

Next, the fabric is dried. Preferably, drying of a thus processed fabric is accomplished at about 100°C while the fabric is preferably simultaneously stretched in a weft direction by about 3 to 5% in order to balance a shrinking which characteristically can take place during processing and which can offset warp direction effects. Such a stretching can take place by means of warp holders in a stretching frame, if desired. Drying is accomplished preferably under conditions such that a fabric can subsequently be stretched equally in each of the warp and weft directions.

After the fabric has been preferably substantially completely dried, it is fixed. A fixing can take place, for example, preferably at about 175° to 185°C, and preferably in the presence of flowing hot air, using total time of preferably from about 30 to 40 seconds.

Now the fabric is stabilized in such a way that changes in length or width characteristically will no longer occur. Also, aging of the thus treated fabric characteristically will not take place.

Figure 2:
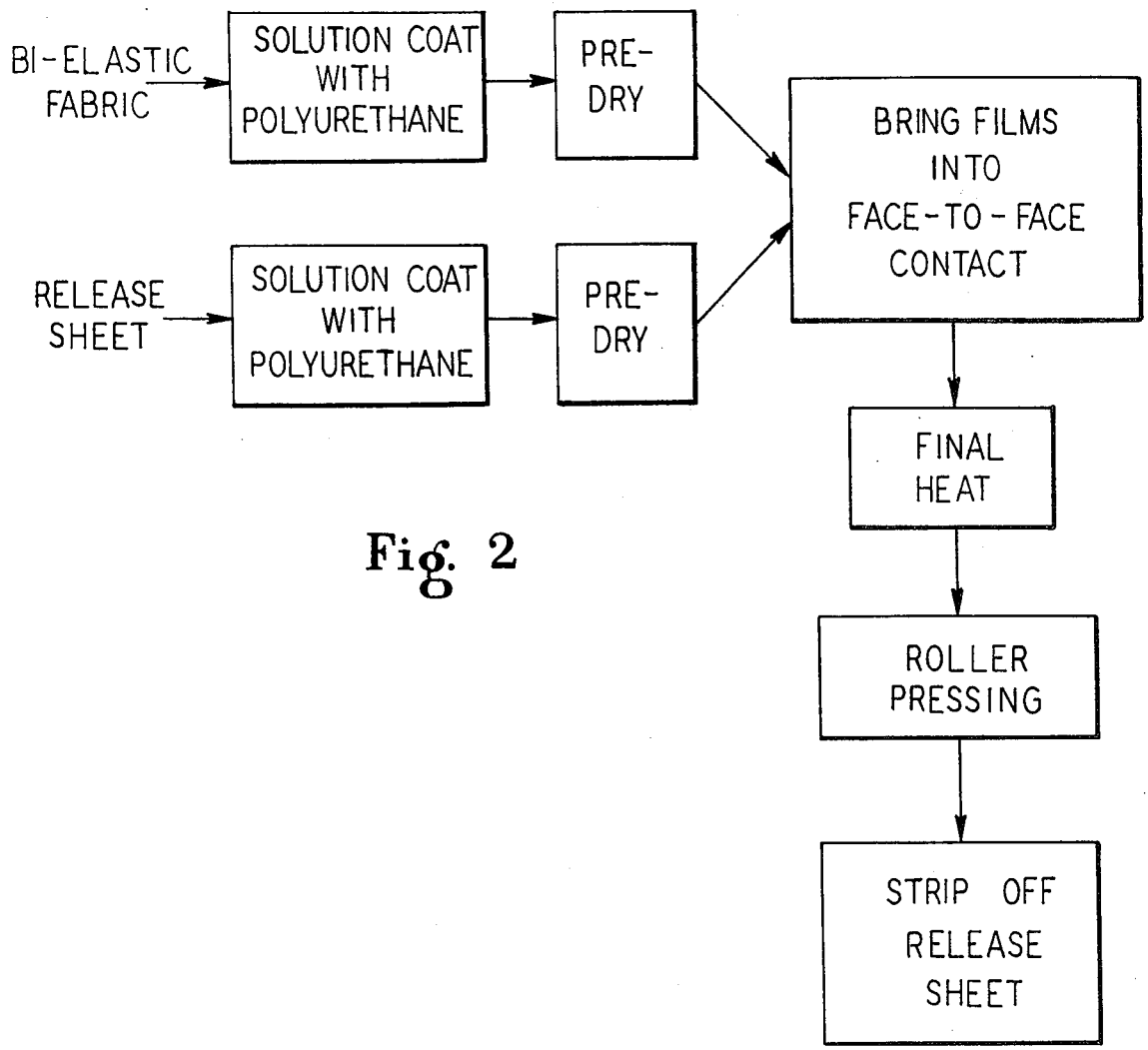
FIG. 2 is a flow sheet illustrating the technique employed to form the elastomeric, gas-tight film on the back of the fabric of FIG. 1.

To coat the bi-elastic fabric with an elastomeric, gas tight layer on its back face, the following procedure as illustrated in FIG. 2 is used:

A first film 17 of a polyurethane is produced on the back of the stabilized, preferably fixed bi-elastic fabric 14 by solution coating using a conventional technique, such as a roller, doctor blade, or the like. For example, one can employ a solution of the one-component polyurethane available commercially under the trade mark "Impranil c" from Farbenfabriken Bayer of West Germany, such as a 30 weight percent solution of Impranil c in ethyl acetate. After application, this coating is dried preliminarily at, in this example, about 80° to 90°C. The coating thickness is sufficient to produce a layer after such a drying operation of about 15 to 25 microns in thickness, though thicker and thinner layers can be used. This first film 17 is directly adhered to the fabric 14 and functions to produce a smooth surface for a second film 18.

Independently, though conveniently concurrently, with the production of the first film 17 there is produced a second film 18 of a polyurethane. Film 18 can be conveniently produced by solution coating a sheet of release paper or the like. For example, one can use as the release paper a siliconized paper sheet, and, as the coating solution, a 30 weight percent of a polyurethane such as one available commercially under the trade designation ENB 01, or under the trade designation ENB 02, from Farbenfabriken Bayer of W. Germany. The solvent can be a mixture, such as a mixture of dimethylformamide and methyl ethylketone. The solution is coated on the release paper by any conventional technique using a roller, doctor blade or the like. Thereafter, the coated film is dried preliminarily at, in this example, about 90° to 110°C. The coating thickness is sufficient to produce a layer after such a drying operation of about 15 to 25 microns in thickness, though thicker and thinner layers can be used.

Next, the film formed on the release paper is brought into face to face, uniform contact with the film formed on the back side of the bi-elastic fabric, after which the composite is heated at a temperature in the range, in this example, of from about 80° to 90°C. Thereafter, the release sheet is pressed by roller means against the fabric whereby the two initially separate polyeurathane films are laminated together.

Finally, the release sheet is pulled or drawn from the final composite film which is adhered to the back of the bi-elastic fabric. The composite film ranges preferably from about 45 to 50 microns, though thicker and thinner layers can be used.

One preferred class of stabilized fabrics of this invention has from about 12 to 25 warp members per lineal inch and from about 12 to 25 weft members per lineal inch.

PREFERRED EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

For the production of a fabric of the present invention with a finished width of 1 meter, there is employed for both the warp and weft a twisted ply yarn composed of three components. The first component is a polyurethane thread of 200 denier, the second component is a polyacrylic yarn of 15 denier, and the third component is a polyacrylic yarn of 5 denier.

Using a loom with a reed width of about 2.5 meters, the warp and weft members are woven with substantially the same tension, whereby the weft threads are placed one in front of the other with equal tension on each and the weft as well as the warp density are each adjusted in such a way that the product fabric has an equal stretch of 30% in each of the warp and weft directions.

EXAMPLE 2

The finished fabric of Example 1 is steam shrunk in a relaxed state and is decondensed in rolled-up condition. Then, a 20 to 30 minute long washing of the relaxed fabric is done in a slightly alkaline aqueous wash liquor at 40°–50°C in the presence of about 0.2 gms/liter of dissolved "Levapon" 150, a trademark of the Bayer Company of a non-ionic surfactant, together with about 0.5g per l. of dissolved trisodium phosphate. After a subsequent rinsing with water, a dipping of the relaxed fabric at about 40°C is carried out in an aqueous bath which has been acidified by means of acetic acid to a pH of about 5 to 6.

Next, puffing or freshening treatment is undertaken by dipping the relaxed fabric in a solution of 0.5 wt % per kilogram of "Persoftal" WKF (a trademark of Bayer for a fabric softener).

Thereafter, the fabric is dried at about 100°C with the weft fibers particularly being under a constant low tension so as to permit the dried fabric to be equally stretchable in both weft and warp directions.

The so dired fabric is then fixed at about 175° to 180°C in the presence of flowing hot air for 30 to 40 seconds.

EXAMPLE 3

The fabric of Example 2 is roller coated with a 30 wt. % solution in ethyl acetate of a one component polyurethane available commercially under the trade mark Impranil c from Farbenfabriken Bayer. After application this coating is dried preliminarily at a temperature in the range from about 80° to 90°C to produce a coating thickness of from about 15 to 20 microns.

Separately upon a sheet of siliconized paper there is coated a 30 wt. % solution of polyurethane available commercially under the trade designation ENB 01 from Farbenfabriken Bayer, the solution is a mixture of dimethylformamide and methyl ethylketone. The coating is dried at a temperature of from about 90° to 110°C to produce a film having a thickness from about 15 to 20 microns in thickness.

The film formed on the release paper is conducted with a film formed on the bi-elastic fabric, after which the composite is heated and further dried at a temperature in the range of from about 80° to 90°C. Thereafter, the release sheet is pressured by a roller and the two polyurethane films are laminated together to form two-ply laminants.

The product stabilized bi-elastic fabric construction is adapted for use in film filling or in vacuum deep drawing.

What is claimed is:

1. In a process for making a stabilized bi-elastic fabric construction, said construction being one of the type comprising:
    A. a woven bi-elastic fabric whose warp and weft members are each formed of a ply yarn,
    B. said ply yarn comprising in combination:
        1. an elastomeric thread from about 140 to 280 denier,
        2. a coarse, staple, non-stretchable yarn of about 10 to 15 denier, and
        3. a fine staple, non-stretchable yarn of from about 4 to 6 denier,
        4. said coarse yarn and said fine yarn being so twisted with said elastomeric thread that said elastomeric thread is substantially hidden in said ply yarn when observed in side elevation, the improvement which comprises stabilizing such fabric construction by the steps of:
  A. steam shrinking said fabric in a relaxed state until the individual fibers are brought together into approximate adjoining relationship,
  B. decondensing said relaxed, steam shrunk fabric,
  C. washing said so decondensed, relaxed fabric in a neutral or slightly alkaline bath while maintaining bath temperature in the range of about 40°C to 50°C.,
  D. drying said so washed fabric at about 100°C. while simultaneously stretching as necessary in each of warp and weft directions to permit said fabric, when dry, to be about equally elastic in each of warp and weft directions, and
  E. fixing said so dried and stretched fabric at about 175° to 185°C. for about 30 to 40 seconds.

2. The process of claim 1 wherein between said washing and said drying, said fabric is padded.

3. The process of claim 2 wherein said fabric during said padding is tensioned in each of warp and weft directions less than about 3%.

4. The process of claim 1 wherein said so-stabilized bi-elastic fabric is further processed by the steps of:
  A. coating on the back face of said bi-elastic fabric a solution of a polyurethane and drying said coating so as to form on said back face a film ranging from about 15 to 25 microns in thickness,
  B. coating a release paper with a solution of a polyurethane and drying said coating so as to form on said release paper a film ranging from about 15 to 25 microns in thickness,
  C. bringing the open face of the film produced in step (A) into face-to-face contact with the film produced in step (B) and heating to a temperature of from about 80° to 90°C., and
  D. compressing such resulting so-heated two films together, thereby to laminate such together into a composite.

5. A process for forming a fabric construction comprising the steps of:
  A. weaving a bi-elastic fabric warp and weft members each formed of a ply yarn comprising in combination
    1. an elastomeric thread of from about 140 to 280 denier,
    2. a coarse, staple, non-stretchable yarn of about 10 to 15 denier, and
    3. a fine staple, non-stretchable yarn of from about 4 to 6 denier,
    4. said coarse yarn and said fine yarn being so twisted with said elastomeric thread that said elastomeric thread is substantially hidden in said ply yarn when observed in side elevation,
  B. stabilizing said fabric by the steps of:
    1. steam shrinking said fabric in a relaxed state until the individual fibers are brought together into approximate adjoining relationship,
    2. decondensing said relaxed, steam shrunk fabric,
    3. washing said so decondensed, relaxed fabric in a neutral or slightly alkaline bath while maintaining bath temperature in the range of about 40°C. to 50°C.,
    4. drying said so washed fabric at about 100°C. while simultaneously stretching as necessary in each of warp and weft directions to permit said fabric, when dry, to be about equally elastic in each of warp and weft directions, and
    5. fixing said so dried and stretched fabric at about 175° to 185°C. for about 30 to 40 seconds, and
  C. covering the back face of said so stabilized fabric with an elastomeric, two ply laminate by the steps of:
    1. coating on said back face of said bi-elastic fabric a solution of a polyurethane and drying said coating so as to form on said back face a film ranging from about 15 to 25 microns in thickness,
    2. coating a release paper with a solution of a polyurethane and drying said coating so as to form on said release paper a film ranging from about 15 to 25 microns in thickness,
    3. bringing the open face of the film produced in (1) into face-to-face contact with the film produced in (2) and heating to a temperature of from about 80° to 90°C., and
    4. compressing such resulting two films together, thereby to laminate such together.

\* \* \* \* \*